(12) United States Patent
Ormsbee et al.

(10) Patent No.: US 9,476,446 B2
(45) Date of Patent: Oct. 25, 2016

(54) SYSTEMS AND METHODS FOR A LOCKING DOUBLE CARABINEER

(71) Applicant: Nite Ize, Inc., Boulder, CO (US)

(72) Inventors: Bowden Ormsbee, Longmont, CO (US); Peter Zagone, Boulder, CO (US)

(73) Assignee: Nite Ize, Inc., Boulder, CO (US)

( * ) Notice: Subject to any disclaimer, the term of this patent is extended or adjusted under 35 U.S.C. 154(b) by 0 days.

(21) Appl. No.: 14/759,387

(22) PCT Filed: Jan. 6, 2014

(86) PCT No.: PCT/US2014/010331
§ 371 (c)(1),
(2) Date: Jul. 6, 2015

(87) PCT Pub. No.: WO2014/107659
PCT Pub. Date: Jul. 10, 2014

(65) Prior Publication Data
US 2015/0337887 A1 Nov. 26, 2015

Related U.S. Application Data

(60) Provisional application No. 61/749,342, filed on Jan. 6, 2013.

(51) Int. Cl.
*F16B 45/02* (2006.01)
*F16M 13/02* (2006.01)
*A44C 5/20* (2006.01)

(52) U.S. Cl.
CPC .............. *F16B 45/02* (2013.01); *F16M 13/02* (2013.01); *A44C 5/2038* (2013.01); *Y10T 24/3485* (2015.01); *Y10T 24/44256* (2015.01); *Y10T 24/45293* (2015.01)

(58) Field of Classification Search
None
See application file for complete search history.

(56) References Cited

U.S. PATENT DOCUMENTS 25,082 A * 8/1859 Pollak .................... A44C 5/145
24/598.4
286,253 A * 10/1883 Benson ................... F16B 45/02
24/599.5

(Continued)

FOREIGN PATENT DOCUMENTS

CN 202456777 U 10/2012
DE 137445 C 12/1902

(Continued)

OTHER PUBLICATIONS

International Search Report in co-pending PCT Application No. PCT/US2014/010331 dated May 12, 2014.
European Search Report in co-pending EP App. No. 14735388.2 dated Jun. 24, 2016 (6 pages).

*Primary Examiner* — Robert J Sandy
*Assistant Examiner* — David Upchurch
(74) *Attorney, Agent, or Firm* — Robert P. Ziemian; Haynes and Boone, LLP

(57) ABSTRACT

An apparatus for attaching items includes a body and a first and second hook oriented on a first and second side of the body. The apparatus further includes a first and second gate, the first gate attached to the body and oriented to close the first hook, the second gate attached to the body and oriented to close the second hook. The apparatus further includes a pivoting lock, the pivoting lock oriented in the body, the pivoting lock having a first position where a first end of the pivoting lock rests against the first gate and a second end of the pivoting lock rests against the second gate preventing the first and second gates from opening; and a second position where the first end of the pivoting lock does not rest against the first gate and the second end of the pivoting lock does not rest against the second gate, and the first and second gates may be opened.

16 Claims, 2 Drawing Sheets

(56) References Cited

U.S. PATENT DOCUMENTS

| | | | | |
|---|---|---|---|---|
| 582,780 | A | * | 5/1897 | Eldridge ................ F16B 45/02 24/375 |
| 1,709,235 | A | * | 4/1929 | Shaffer ................... F16B 45/02 24/375 |
| 2,357,478 | A | * | 9/1944 | Koch ...................... F16G 11/14 24/129 R |
| 5,384,943 | A | | 1/1995 | Lefebvre |
| 2006/0162138 | A1 | | 7/2006 | Shigejiro |
| 2009/0000086 | A1 | * | 1/2009 | Bing ....................... F16B 45/06 24/592.11 |
| 2013/0232741 | A1 | * | 9/2013 | Liang ..................... F16B 45/02 24/600.2 |

FOREIGN PATENT DOCUMENTS

| | | |
|---|---|---|
| GB | 266644 A | 3/1927 |
| JP | H10299756 A | 11/1998 |
| WO | WO2009092576 A1 | 4/2009 |

\* cited by examiner

SYSTEMS AND METHODS FOR A LOCKING DOUBLE CARABINEER

CROSS-REFERENCES TO RELATED APPLICATIONS

This application is a National Stage of PCT Application No. PCT/US2014/010331 filed on Jan. 6, 2014, which PCT application claims the benefit of U.S. Provisional Application No. 61/749,342 filed Jan. 6, 2013. The above PCT and provisional patent applications are hereby incorporated by reference to the same extent as though fully contained herein.

BACKGROUND

Carabineers find usage in many situations for securely hanging objects from a variety of attachment points. At times, the gate on a carabineer may be dislodged by occurrences during movement and may result in the opening of the gate and the detachment of the carabineer. This detachment is undesirable.

SUMMARY

In one embodiment, an apparatus for attaching items includes a body and a first and second hook oriented on a first and second side of the body. The apparatus further includes a first and second gate, the first gate attached to the body and oriented to close the first hook, and the second gate attached to the body and oriented to close the second hook. The apparatus further includes a pivoting lock, the pivoting lock oriented in the body, the pivoting lock having a first position where a first end of the pivoting lock rests against the first gate and a second end of the pivoting lock rests against the second gate preventing the first and second gate from opening, and a second position where the first end of the pivoting lock does not rest against the first gate and the second end of the pivoting lock does not rest against the second gate and the first and second gate may be opened. Optionally, the body and the first and second hook have an "S" shape, and the body has a rounded central portion and a first and second notch on either side of the "S" shape, the pivoting lock including a first and second tab, the first and second tabs oriented around the rounded central portion, the first and second tabs being located in the first and second notches, respectively, when the pivoting lock is in the first position. In one configuration, the first and second gates are essentially parallel when closed, and a distance from the first gate to the second gate is slightly less than a length from the first end of the pivoting lock to the second end of the pivoting lock. In another configuration, when the first and second tab rest in the first and second notches, respectively, the pivoting lock is at an acute angle to each of the first and second gates; and in order to move the pivoting lock to the second position, the pivoting lock must pass through a position perpendicular to the first and second gates; and in order to pass through the position, the pivoting lock must deform slightly due to the distance from the first gate to the second gate being slightly less than the length from the first end of the pivoting lock to the second end of the pivoting lock. Optionally, the round central portion is slightly asymmetrical such that, to turn the pivoting lock to the first and second notches, the first and second tabs must flex slightly. In one alternative, a first distance from a portion of the rounded central portion before the first notch to the first gate is slightly less than a thickness of the first tab; and the first tab must deform slightly in order to pass to the first notch. Optionally, in the first position the pivoting lock is at a non-perpendicular angle to the first gate and the second gate. In one configuration, to move from the first position to the second position the pivoting lock traverses a position where it has a perpendicular angle to the first gate and the second gate. Alternatively, the apparatus, in the first position, is configured such that an inward pressure on the gates tends to push the pivoting lock away from the perpendicular angle to the first gate and the second gate and towards a stop of the body.

In another embodiment an apparatus for attaching items includes an S-shaped body, the S-shaped body having a first hook at a first end and a second hook at a second end. The apparatus further includes a first and second gate oriented to close the first and second hooks, the first and second gates opening inward toward the center of the S-shaped body. The apparatus further includes a pivoting lock, located in the center of the S-shaped body, the pivoting lock having a first position where a first and second end are proximate to the first and second gates, respectively, and prevent the first and second gates from opening, and a second position where the first and second ends are not proximate to the first and second gates and the first and second gates may be opened (or are operable). Optionally, the S-shaped body has a rounded central portion and a first and second notch on either side of the S-shaped body near a pivot point of each of the first and second gates, respectively, the pivoting lock including a first and second tab, the first and second tabs oriented around the rounded central portion, the first and second tabs being located in the first and second notches, respectively, when the pivoting lock is in the first position. Optionally, pressure on the first gate pushes the first tab into the first notch when the pivoting lock is in the first position and the pivoting lock is prevented from further rotating by the first notch. Alternatively, the first and second gates are essentially parallel when closed and a distance from the first gate to the second gate is slightly less than a length from the first end of the pivoting lock to the second end of the pivoting lock. Optionally, in the first position the pivoting lock is at a non-perpendicular angle to the first gate and the second gate. Alternatively, to move from the first position to the second position the pivoting lock traverses a position where it has a perpendicular angle to the first gate and the second gate. Optionally, the apparatus, in the first position, is configured such that an inward pressure on the gates tends to push the pivoting lock away from the perpendicular angle to the first gate and the second gate and towards a stop of the body.

BRIEF DESCRIPTION OF THE DRAWINGS

FIG. 1b shows a rear view of the locking double carabineer of FIG. 1a;

FIG. 2 shows the hook portion of the locking double carabineer of FIG. 1a;

FIG. 3 shows the pivoting lock portion of the locking double carabineer of FIG. 1a; and FIG. 4 shows the gate of the locking double carabineer of FIG. 1a.

DETAILED DESCRIPTION OF THE DRAWINGS

Figure 1A:
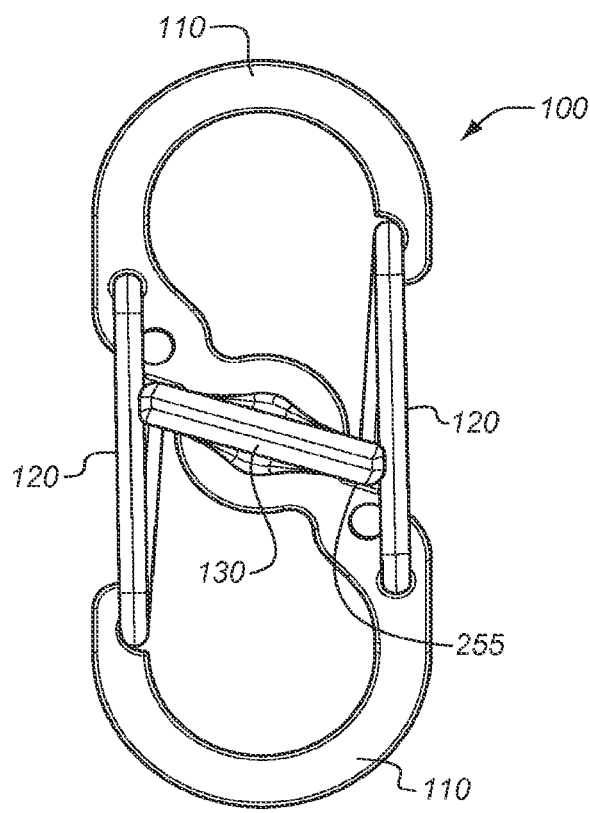
FIG. 1a shows a front view of one embodiment of a locking double carabineer.
Figure 1B:
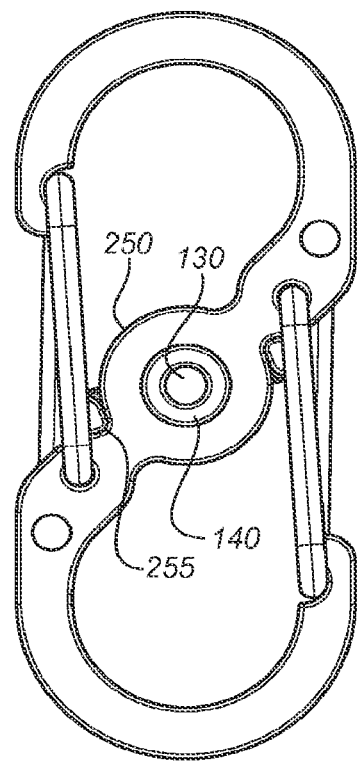

Various systems and methods are included in a locking double carabineer. FIG. 1a shows one embodiment of a locking double carabineer (LDC) 100. LDC 100 includes a top and bottom hook 110. Gates 120 are oriented to close over each hook 110. Pivoting lock 130 provides for the locking of the gates 120 of the LDC 100. As is clear from the figure, the ends of the pivoting lock 130 brace the gates 120 of the LDC 100. Therefore, even when pressure is applied to the gates 120, they will not open. When the pivoting lock 130 is turned to a horizontal configuration, the gates 120 may open normally. FIG. 1b shows a reverse view of the LDC 100 showing the peg portion of pivoting lock 130 and cap 140. In order to hold the end of the pivoting lock in place, a circular cap 140 is affixed to it. This prevents the peg portion from releasing from the body of the LDC 100.

Figure 2:
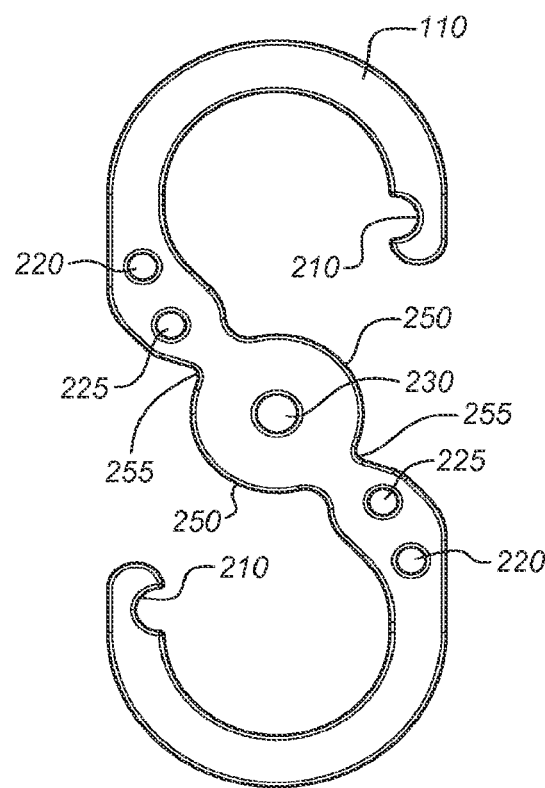

FIG. 2 shows the hook 110 portions of the LDC 100 with the additional hardware removed. The hook portion includes gate apertures 220, 225, lock aperture 230, and gate notches 210. The shape of the central portion of the hook portions 110 is important as well. Curved sections 250 and notches 255 provide for the turning and locking in place of the locking portion 130. Curved sections 250 are shaped such that the perpendicular distance between the gates 120 is slightly less than the length of the locking bar 310 of the pivoting lock 130. Therefore, increased pressure is required to turn the pivoting lock 130 until tabs 320 rest in notches 255. Once tabs 320 rest in notches 255, the same deformation of the pivoting lock 130 is required to release the lock.

In an alternative embodiment, the shape of curved portion 250 may be made slightly asymmetrical and may bulge slightly as the curved portion 250 approaches notch 255. In such a configuration, the tabs 320 will flex slightly as they approach notches 255. In another alternative, the gap between the gate 120 and the curved portions 250 may be such that the tabs 320 are compressed to pass through that area to notches 255. All of the techniques described herein for locking the pivoting lock 130 in place may be employed singularly or in concert to provide for the locking of the pivoting lock 130 in place.

Figure 3:
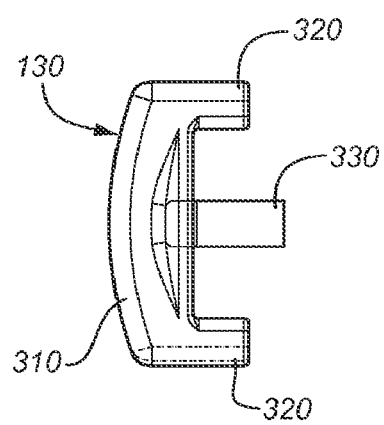

FIG. 3 shows a side view of pivoting lock 130. Pivoting lock 130 includes locking bar 310, tabs 320, and peg 330.

Figure 4:
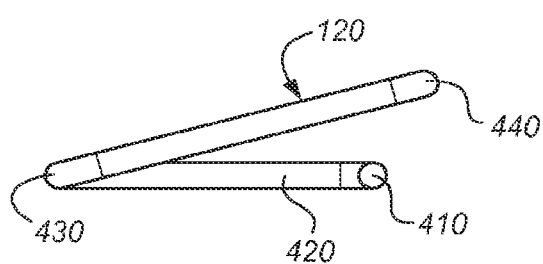

FIG. 4 shows gate 120. Gate 120 includes pegs 410, 440, angled portion 430, and arms 420.

In combination, the angled portion 430 and the offset gate apertures 220, 225 that receive pegs 410, 440 function to provide a spring type pressure to the gates 120 causing them to close automatically. Furthermore, pivoting lock 130 may be turned to traverse curved sections 250 with the tabs 320. The pivoting lock 130 is compressed slightly while traversing between curved sections 250 and gate 120 and comes to rest in notches 255. The length of locking bar 310 of pivoting gate 130 is slightly less than the perpendicular distance from gate 120 to gate 120 on either side of the LDC 100. In order to release the pivoting lock 130, the locking bar 320 is compressed between gate 120 and curved sections 250. Since this pressure must be overcome to release the lock, this locks the pivoting lock 130 in the notches 255. Furthermore, as is visible in FIG. 1a, the angle of the pivoting lock 130 is such that pressure from the gates 120 will tend to push the tabs 320 of pivoting lock 130 into the body of the LDC 100. Such an angle to the gate 120 is generally more desirable, since pressure on the gates 120 will not cause the pivoting lock 130 to release.

Generally, the components of the LDC 100 will be composed of metal and/or plastic. The mechanism of the LDC 100 lends itself to very small scale versions of carabineers. Other locking carbineers exist that use locking mechanisms located on the gate itself; however, for very small scale applications, such location may not be feasible or may be difficult to operate. The LDC 100 also has the advantage of being able to unlock both gates at the same time.

The previous detailed description is of a small number of embodiments for implementing the systems and methods for a locking double carbineer and is not intended to be limiting in scope. The following claims set forth a number of the embodiments of the systems and methods of a locking double carbineer disclosed with greater particularity.

The invention claimed is:

1. An apparatus for attaching items, the apparatus comprising: a body;
   a first and second hook oriented on a first and second side of the body;
   a first and second gate, the first gate attached to the body and oriented to close the first hook, the second gate attached to the body and oriented to close the second hook;
   a pivoting lock, the pivoting lock oriented in the body, the pivoting lock having a first position where a first end of the pivoting lock rests against the first gate and a second end of the pivoting lock rests against the second gate preventing the first and second gates from opening; and a second position where the first end of the pivoting lock does not rest against the first gate and the second end of the pivoting lock does not rest against the second gate, and the first and second gates may be opened.

2. The apparatus of claim 1 wherein the body and the first and second hook have an "S" shape and the body has a rounded central portion and a first and second notch on either side of the S-shape, the pivoting lock including a first and second tab, the first and second tabs oriented around the rounded central portion, the first and second tabs being located in the first and second notches, respectively, when the pivoting lock is in the first position.

3. The apparatus of claim 2 wherein the first and second gates are essentially parallel when closed and a distance from the first gate to the second gate is slightly less than a length from the first end of the pivoting lock to the second end of the pivoting lock.

4. The apparatus of claim 3 wherein when the first and second tabs rest in the first and second notches, respectively, the pivoting lock is at an acute angle to each of the first and second gates, and in order to move the pivoting lock to the second position, the pivoting lock must pass through a position perpendicular to the first and second gates; and in order to pass through the position, the pivoting lock must deform slightly due to the distance from the first gate to the second gate being slightly less than the length from the first end of the pivoting lock to the second end of the pivoting lock.

5. The apparatus of claim 2 wherein the round central portion is slightly asymmetrical such that, to turn the pivoting lock to the first and second notches, the first and second tabs must flex slightly.

6. The apparatus of claim 2 wherein a first distance from a portion of the rounded central portion before the first notch to the first gate is slightly less than a thickness of the first tab, and the first tab must deform slightly in order to pass to the first notch.

7. The apparatus of claim 1, wherein in the first position the pivoting lock is at a non-perpendicular angle to the first gate and the second gate.

8. The apparatus of claim 7, wherein to move from the first position to the second position the pivoting lock traverses a position where it has a perpendicular angle to the first gate and the second gate.

9. The apparatus of claim 8 wherein the apparatus, in the first position, is configured such that an inward pressure on the gates tends to push the pivoting lock away from the perpendicular angle to the first gate and the second gate and towards a stop of the body.

10. An apparatus for attaching items, the apparatus comprising:
   an S-shaped body, the S-shaped body having a first hook at a first end and a second hook at a second end;
   a first and second gate oriented to close the first and second hooks, the first and second gates opening inward toward the center of the S-shaped body; and
   a pivoting lock, located in the center of the S-shaped body, the pivoting lock having a first position where a first and second end are proximate to the first and second gates, respectively, and prevent the first and second gates from opening; and a second position where the first and second ends are not proximate to the first and second gates, and the first and second gates are operable.

11. The apparatus of claim 10 wherein the S-shaped body has a rounded central portion and a first and second notch on either side of the S-shaped body near a pivot point of each of the first and second gates, respectively, the pivoting lock including a first and second tab, the first and second tabs oriented around the rounded central portion, the first and second tabs being located in the first and second notches, respectively, when the pivoting lock is in the first position.

12. The apparatus of claim 10 wherein pressure on the first gate pushes the first tab into the first notch when the pivoting lock is in the first position, and the pivoting lock is prevented from further rotating by the first notch.

13. The apparatus of claim 10 wherein the first and second gate are essentially parallel when closed, and a distance from the first gate to the second gate is slightly less than a length from the first end of the pivoting lock to the second end of the pivoting lock.

14. The apparatus of claim 10, wherein in the first position the pivoting lock is at a non-perpendicular angle to the first gate and the second gate.

15. The apparatus of claim 14, wherein to move from the first position to the second position the pivoting lock traverses a position where it has a perpendicular angle to the first gate and the second gate.

16. The apparatus of claim 15 wherein the apparatus, in the first position, is configured such that an inward pressure on the gates tends to push the pivoting lock away from the perpendicular angle to the first gate and the second gate and towards a stop of the body.

* * * * *